April 5, 1960            H. GELB            2,931,268
APPARATUS FOR ORIENTING PHOTOGRAPHIC IMAGES
Filed June 2, 1953            4 Sheets-Sheet 1
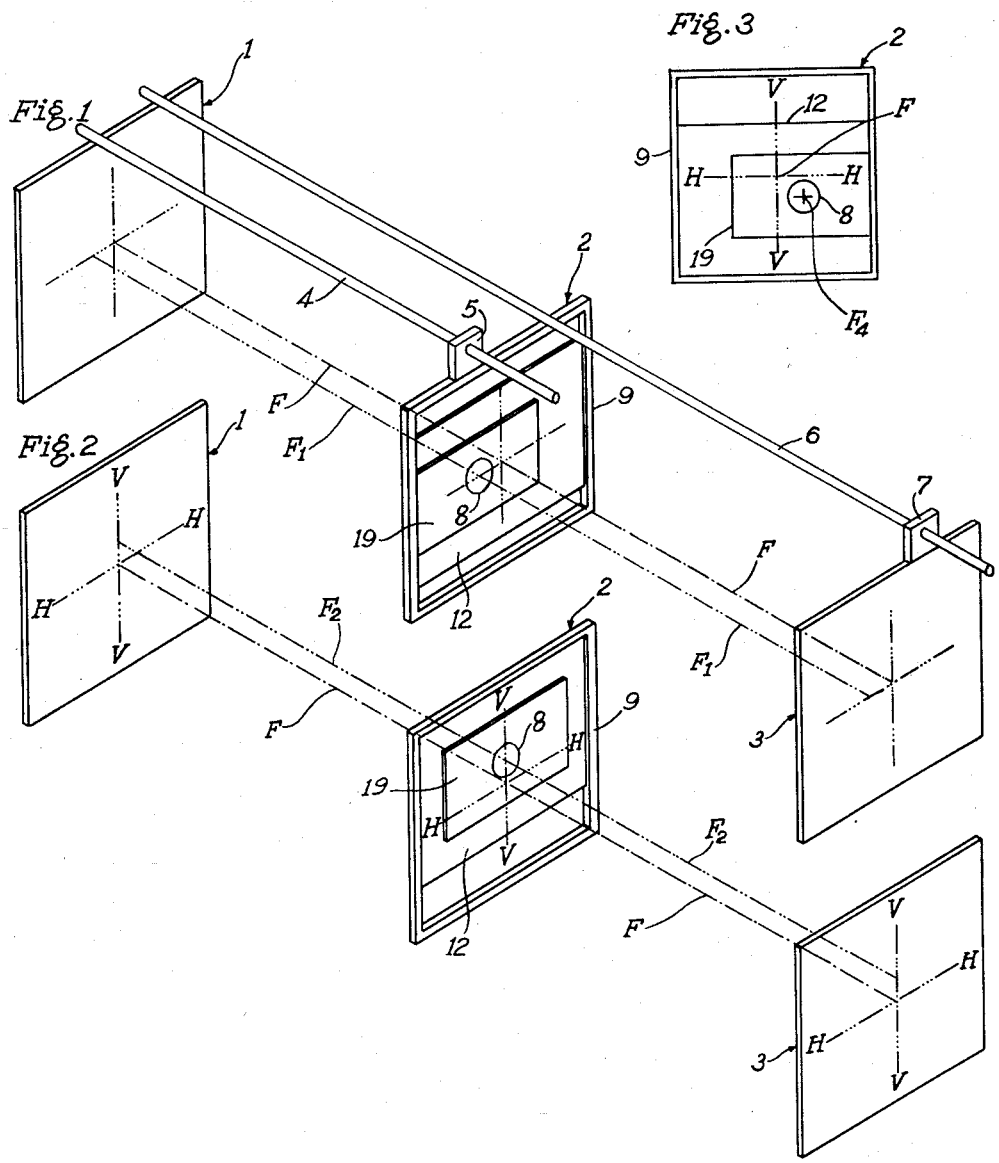
INVENTOR.
Herbert Gelb
BY
ATTORNEY April 5, 1960 H. GELB 2,931,268
APPARATUS FOR ORIENTING PHOTOGRAPHIC IMAGES
Filed June 2, 1953 4 Sheets-Sheet 2
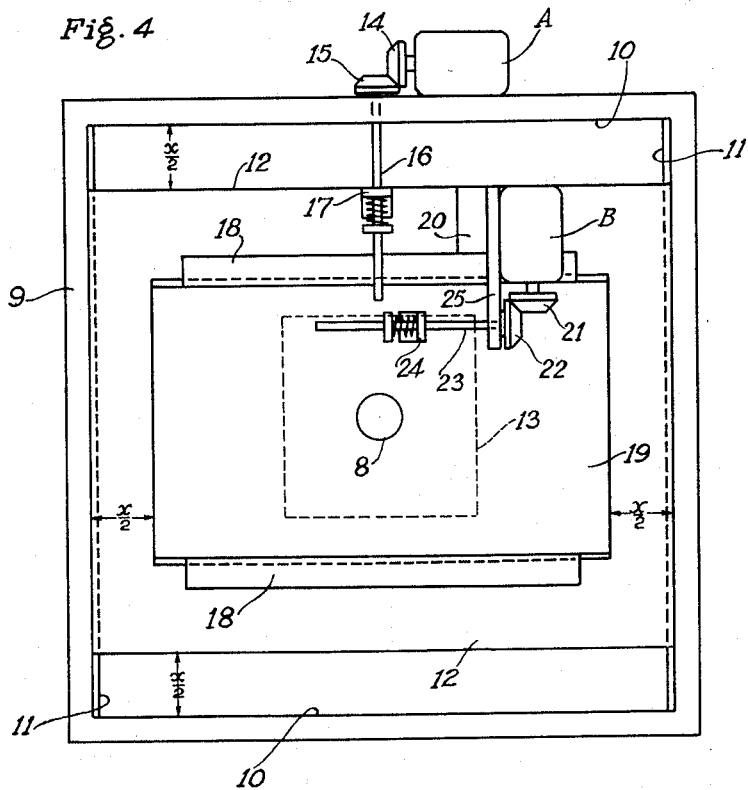
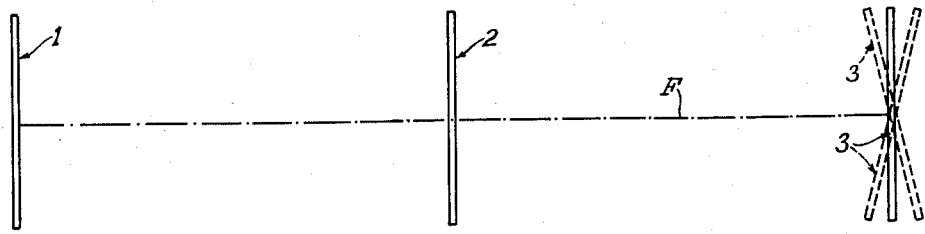
INVENTOR
*Herbert Gelb*
BY
*Howard E. Rackenbach*
ATTORNEY April 5, 1960   H. GELB   2,931,268
APPARATUS FOR ORIENTING PHOTOGRAPHIC IMAGES
Filed June 2, 1953   4 Sheets-Sheet 3
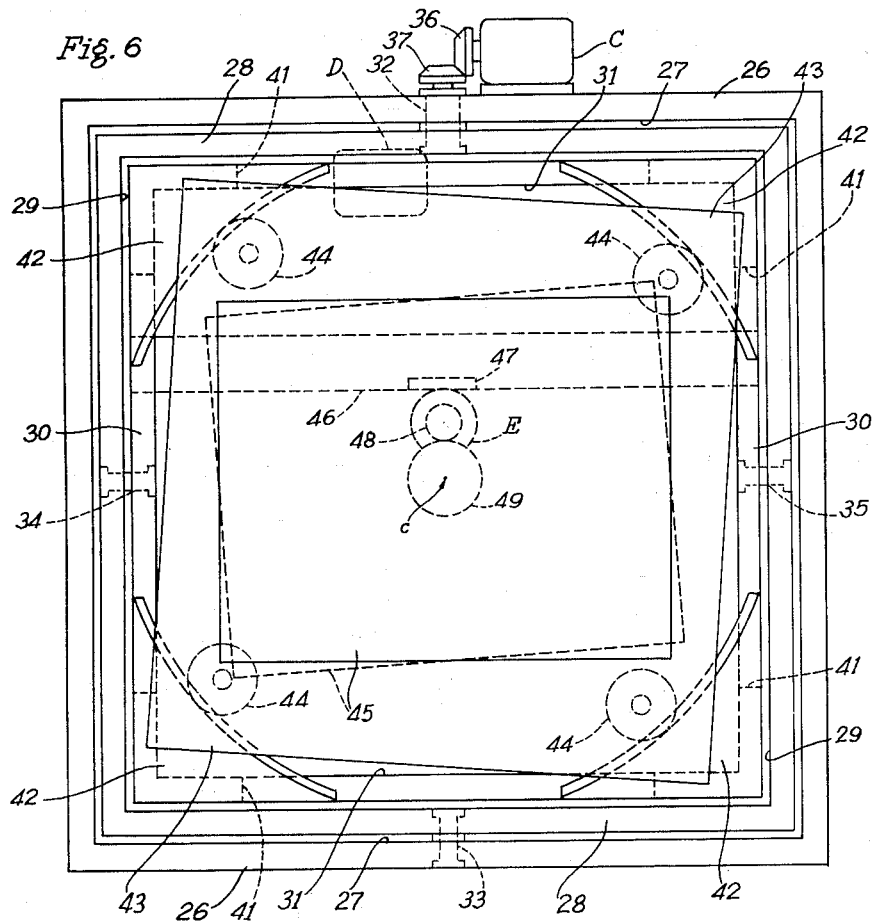
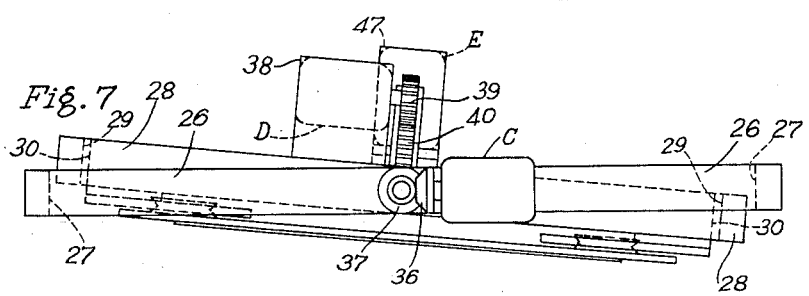
INVENTOR.
Herbert Gelb
BY
ATTORNEY April 5, 1960  H. GELB  2,931,268
APPARATUS FOR ORIENTING PHOTOGRAPHIC IMAGES
Filed June 2, 1953  4 Sheets-Sheet 4
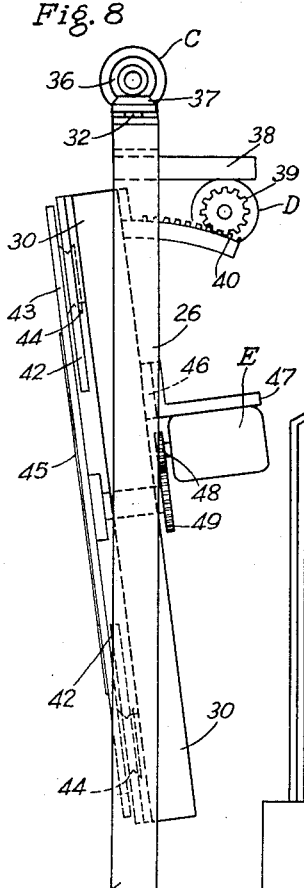
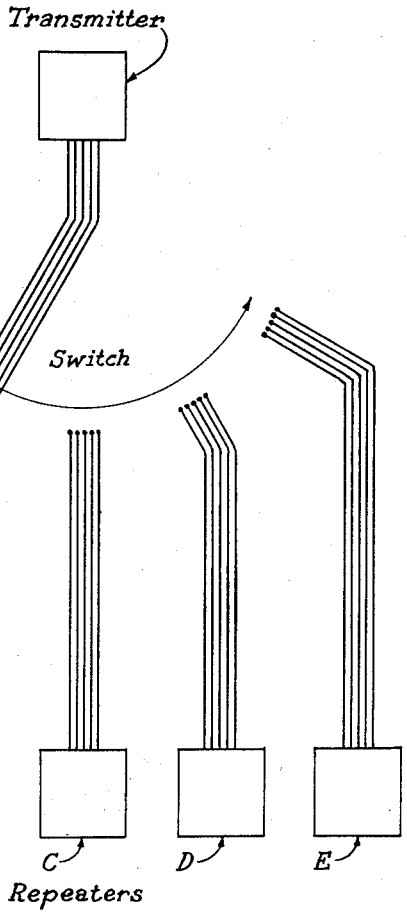
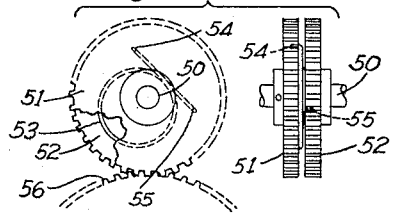
INVENTOR.
Herbert Gelb
BY
ATTORNEY ※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※※

United States Patent Office 2,931,268
Patented Apr. 5, 1960

2,931,268

APPARATUS FOR ORIENTING PHOTOGRAPHIC IMAGES

Herbert Gelb, New York, N.Y., assignor to Joseph Gelb Company, Newark, N.J., a sole proprietorship of Joseph Gelb Application June 2, 1953, Serial No. 359,192

4 Claims. (Cl. 88—24)

This invention relates to photographic and optical apparatus wherein the image of a subject is projected upon a sensitized or viewing surface through a lens; and, of course, such apparatus may be a camera or an enlarger.

The general object of the invention is to provide novel means, for use with such apparatus, for varying the orientation of the subject image upon the sensitized or viewing surface.

As the invention has particular relationship to cameras, the preamble may be more readily understood if it be assumed that the means are applied to a camera, and herein, generally, well-known terms signifying camera elements are employed. However, it will be understood that such employment of camera terms is not in limitation of the scope of the invention, but is merely for the purpose of conveniently describing the invention.

Orientation of the subject image upon, say, a film, is a function distinct from and in addition to adjustment of focus and adjustment relating to enlarging and reducing as generally understood. Herein orientation signifies any change in the position of the subject image on the film from and including the position such image would normally occupy were the planes of the film and of the subject at right angles to the focal axis of the lens and such focal axis intersected both the film and subject centrally in usual manner. For example, the term varying the orientation may cover shifting the lens at right angles to the usual position of its focal axis within the camera whereby the image lies upon the film eccentrically, and whereby the image is that of an eccentric portion of the subject. Here, of course, it is assumed that neither the film nor the subject were moved. The subject may be a map of a particular area of which it is desired most clearly to photograph. Or the subject may comprise several distinct figures one of which is desired to be most clearly photographed, possibly with other figures masked out. It will be obvious that the effect of shift may be achieved by moving the film and subject while the lens remains stationary; but in preferred structures illustrated and described herein the lens is shifted, as this procedure has been found to be most convenient, especially where large process cameras are involved. Also the term varying the orientation may signify rotation of the subject within its own plane, and rotation of the subject about either of two axes intersecting at right angles. In a horizontal type camera orientation of the image upon the film may be varied, for, say, correcting scale errors present in slanting shots of terrain taken from an airplane aloft, by tilting or swinging the subject. It is true that a correction of this type might be made by tilting or swinging the film, but this procedure has been found to be undesirable. Thus, in preferred structures illustrated and described herein the subject is oscillated, tilted, and swung.

Herein the term holder for sensitized material signifies generally a plate or film holder. The general structure carrying the lens is referred to as a lens board. And the general structure carrying the copy is referred to as a copy board.

As a convenience in describing the invention a camera of the horizontal type is presumed to be equipped with the present means of orientation. While the focal axis of the lens is always horizontally disposed, it is not invariably the centerline of the camera, as it may be shifted up and down and sidewise.

A particular object of the present invention is that the orientation of the subject image upon the sensitized material be controlled remotely, as, for example, where a process camera of considerable size is involved and is so constructed that its rear portion actually forms part of the wall of a dark room. In camera installations of this type the camera stand usually is mounted in an exposed position upon the general work floor, and the photographer would be put to considerable trouble were he required to leave the dark room and go outside on the work floor to make orientation adjustments. Preferably, therefore, control of orientation is made available within the dark room.

The invention in its full scope contemplates five different movements of parts resulting in variations of the orientation of the subject image upon the sensitized material; and these are (1) shifting the focal axis of the lens up and down, (2) shifting the focal axis left and right, (3) swinging the subject, which is to say rotating the same on a vertical axis, (4) tilting the subject, which is to say rotating the same on a horizontal axis, and (5) oscillating or rotating the subject within its own plane. It will be found herein that some or all of these five movements of parts may be utilized to solve all ordinary orientation problems.

The first two movements of parts, i.e., (1) and (2), above, have to do with the general lens board structure; and the third, fourth, and fifth movements of parts, i.e., (3), (4), and (5), above, have to do with the general copy board structure.

The invention provides separate means for effecting each of the five movements. Each means comprises a Selsyn repeater or another repeater type motor. Preferably a single Selsyn transmitter, or other type of transmitter, depending upon the type of motor used, is relied upon to work any one of the repeaters at a time to effect the particular parts movement related to the selected repeater. Where the system employs the Selsyn principle, as is preferred, a switch is provided for selectively coupling any one of the five repeaters with the transmitter. Both the Selsyn transmitter and the selector switch are most conveniently located in the dark room of a large process camera. It is to be pointed out here, however, that each individual parts movement possibly to be desired in orientation of the subject image may be effected with the use of an individual and fixed Selsyn couple. This is to say that, within the scope of the invention, five individual Selsyn couples may be employed, if desired, for handling the five parts movements found to be practically indispensable where great latitude in subject image orientation is required. For example, a coupled Selsyn transmitter and repeater may handle exclusively the shifting up and down of the focal axis of the lens, while another coupled Selsyn transmitter and repeater may handle exclusively the shifting sidewise of the focal axis. In most cases, however, it will be found more economical to utilize a single Selsyn transmitter associated with switching means for selectively coupling it with one or another of the five repeaters related to the five parts movements.

Another object of the invention is to provide means for preventing backlash of a part shifted, swung, tilted, or oscillated, with respect to means for actuating said part.

The invention further contemplates a novel lens board and a novel copy board construction.

These and other objects, features, and advantages of the invention will be more fully understood from the following description, and from the drawing.

In the drawing:

Fig. 1 is a schematic rectilinear perspective view of a horizontal type camera, showing, conventionally, a holder for sensitized material, a lens board, and a copy board, and means for moving the lens board and the copy board toward and away from each other and toward and away from the holder for sensitized material for the purposes of focal adjustment and of enlarging and reducing.

Fig. 2 is also a schematic rectilinear perspective view of the same camera with certain parts omitted.

Fig. 1 is illustrative of the camera with its focal axis shifted horizontally (to the viewer's left) away from the normal centric position of said axis; and Fig. 2 is illustrative of the camera with its focal axis shifted upwardly away from the normal centric position.

Fig. 3 is an elevational diagrammatic view of the lens board structure, showing the focal axis shifted both to the viewer's right and downwardly from the normal centric position of the axis.

Fig. 4 is a more detailed elevational diagrammatic view of the lens board structure and its mechanism.

Fig. 5 may be regarded either as a schematic view of the camera in plan or a schematic view thereof in elevation. Separate schematic views for illustrating the parts movements shown here would be mere duplicates. The holder for sensitized material, the lens board, and the copy board are shown. If the figure be regarded as in plan swinging or rotation of the copy board about a vertical axis is indicated; if the figure be regarded as in elevation tilting or rotation of the copy board about a horizontal axis is indicated.

Fig. 6 is an elevational diagrammatic view of the copy board structure and its mechanism.

Fig. 7 is a top plan view of the same, indicating a swinging or rotation on a vertical axis of the copy board proper and its subject.

Fig. 8 is a side elevational view of the same, indicating a tilting or rotation on a horizontal axis of the copy board proper and its subject.

Fig. 9 is an exemplary circuit diagram.

Fig. 10 is a diagram, in two parts (bracketed), showing an arrangement whereby transmission may be had between spur gears without backlash.

Figs. 1 and 2 show, schematically, a horizontal type camera embodying the invention. A holder for sensitized material is designated 1; a lens board, 2; and a copy board, 3. The holder for sensitized material is stationary; however, the lens board and the copy board may be moved toward and away from each other and toward and away from the holder. A lead screw 4 engaging a threaded lug or the equivalent 5 mounted on the lens board serves to move this element back and forth. Another lead screw 6 engaging another threaded lug or the equivalent 7 mounted on the copy board serves to move this element back and forth. No means for rotating the lead screws for driving their related boards are shown; and no means for supporting the holder, lens board, and copy board are shown: however both classes of means are known in the art, and, further, form no part of the present invention. Reference may be had to U.S. Patent No. 2,585,627, the title of which is "Camera and Stand Therefor," and which shows an arrangement comprising a holder for sensitized material, a lens board, and a copy board, which, with the exception of elements having to do with the present invention, is illustrative in detail of the arrangement shown schematically in Figs. 1 and 2. In the cited patent two lead screws were shown, as indicated here only in Fig. 1, and the screws were motor-driven. The lens board and the copy board were suspended from carriages which were rollably mounted on overhead rails. The present invention is applicable to the camera disclosed in the cited patent and is also applicable to many other cameras.

It is assumed that, under normal conditions, the focal axis of the lens 8 is the centerline of the camera, i.e., the focal axis F intersects the holder, lens board, and copy board at the intersections of their respective horizontal (H—H) and vertical (V—V) centerlines. The horizontal and vertical centerlines of the three elements are indexed on the drawing.

In the present invention the structure of the holder for sensitized material is not important, and in Figs. 1, 2, and 5 where the holder appears it is indicated merely as a plate. Also to simplify Figs. 1, 2, and 5 the copy board is similarly indicated. Figs. 6, 7, and 8, show diagrammatically, a suitable structure for the copy board.

A principal purpose of Figs. 1, 2, and 3—the latter showing the lens board alone, and in elevation—is generally to illustrate, by three examples, the indefinite number of positions to which it may be moved at right angles to its focal axis within a predetermined area forming part of the photographic plane. In Fig. 1 the lens has been shifted to the viewer's left from the center of the camera, and the focal axis, here designated $F_1$, intersects the horizontal centerlines of the holder, lens board, and copy board, but to the left of the vertical centerline of all three elements. In Fig. 2 the lens has been raised from the center of the camera, and the focal axis, here designated $F_2$, intersects the vertical centerlines of the holder, lens board, and copy board, but above the horizontal centerline of all three elements. In Fig. 3 the lens has been shifted to the viewer's right and lowered: here the focal axis is designated $F_4$, and is to the right of and beneath the center of the camera and consequently to the right of and beneath the horizontal and vertical centerline intersections of the three elements. In Fig. 1 the lens is shown shifted to the left as far as possible in the structure indicated; in Fig. 2 the lens is shown raised as high as possible; and in Fig. 3 the lens is shown both shifted to the right, and lowered, as far as possible. The limitations here indicated define an area—the aforementioned predetermined area forming part of the photographic plane. Obviously, if the lens may be moved both up and down and sidewise the focal axis may be positioned so as to pass through any point within such area.

Mechanism for effecting and controlling the movements of the lens at right angles to its focal axis will subsequently be described in detail. Repositioning the lens, as from its normal or usual central position in the camera, requires, as will be seen, two separate movements, these being the equivalent of up and down and sidewise movements. It will be readily seen that separate movements along, say, an east-west axis and a north-south axis, in a vertical-type camera, are not functionally different from the lens movements illustrated in the drawing.

The invention, in its full scope, involves five distinct movements. Two have been described. The other three relate to the copy board, and are the oscillation of the copy board within its own plane, tilting or rotation of the copy board about a horizontal axis, and swinging or rotation of the copy board about a vertical axis.

Fig. 5 is a schematic drawing which may be regarded as illustrative of the camera viewed in elevation and indicating the copy board as tilted from its normal position, and of the camera viewed from above and indicating the copy board as swung from its normal position. Oscillation of the copy board within its own plane is illustrated in Fig. 6. Mechanism for effecting and controlling the three movements of the copy board will subsequently be described in detail.

An essential part of the invention is that all or any of the five desired movements briefly described above be remotely controllable. For example, where a large process camera abutting a dark room is involved, it is an important advantage to a worker in such room that he be able to effect and control such movements as are desired without having to go outside onto the general work floor on which the camera stand is mounted. Thus the present invention provides means which may be positioned within the dark room for selectively effecting and controlling any of the five movements. Especially in large camera structures having great relative movements between the holder for sensitized material, the lens board, and the copy board along the focal axis for purposes of focal adjustment and adjustment relating to enlarging and reducing, mechanical means for effecting and controlling the five movements, such means being directly connected between the dark room and the lens and copy boards, are so complicated as to be wholly undesirable. Herein an individual drive is provided for the purpose of effecting each of the five movements; and, by utilizing a Selsyn repeater as each of such individual drives, only one Selsyn transmitter need be provided in, say, the dark room, to effect and control any selected movement, provided, of course, suitable means are also provided for selectively coupling a particular repeater with the transmitter. A further, and obvious, advantage of effecting the movements electrically rather than mechanically is that considerations of the magnitude of relative movements along the focal axis between the holder, lens board, and copy board are of trifling importance due to the great flexibility of the electrical connections.

It will be understood from Figs. 1, 2, and 5, that the general lens board structure itself does not move either horizontally or vertically with respect to the holder for sensitized material, although the lens itself does move accordingly. Subsequently it will be seen that the holder, the main frame of the lens board structure, and the main frame of the copy board structure need never have horizontal or vertical movements relative to each other, although it may be pointed out that in some cameras the holder may be arranged to be raised or swung out of the photographic plane.

Fig. 4 is an elevational view, in diagram, of an exemplary lens board structure, presumed to be part of a horizontal-type camera and therefore disposed in a vertical plane. The main frame 9 is preferably constructed of material of considerable rigidity, and is of rectangular shape, and is fenestrated at 10, the fenestration also being rectangular and of such magnitude as to leave relatively narrow marginal portions in the main frame. On the left and right upright portions of the main frame, and mounted on the inside thereof, are rails 11. Slidably mounted for vertical movement on said rails is a rectangular panel 12, which is fenestrated at 13 (indicated in dotted lines). The longitudinal dimension of panel 12 is substantially equal to the distance between the inner surfaces of the uprights of the main frame. The latitudinal, here vertical, dimension of panel 12 is considerably less than the distance between the inner surfaces of the horizontal portions of the main frame; hence the panel may slide up and down within the main frame over a range equal to the difference between the vertical dimension of the panel and the distance between the inner surfaces of the upper and lower portions of the main frame. In Fig. 4 the panel 12 is shown to be in a median position. For convenience the total range of travel relating to panel 12 is designated $x$. Thus, in Fig. 4, two dimensions $$\frac{x}{2}$$

are shown, because of the median position of the panel. Of course, insofar as the invention is concerned, the value of $x$ is immaterial; but the index is adopted herein for a subsequent explanation of the predetermined area forming part of the photographic plane mentioned above.

Mounted on the top of the main frame is a Selsyn repeater A, and mounted on its shaft is a bevel gear 14 which engages another bevel gear 15 mounted on the top end of a lead screw 16 which engages a threaded bracket 17 secured to the upper part of panel 12. The upper portion of the lead screw 16 is not threaded and is journaled in the upper horizontal member of the main frame. It is plain that rotation of the lead screw 16 operates to move panel 12 up or down depending upon the direction of rotation of the screw controlled by the direction of rotation of the repeater A.

Mounted on panel 12 are two horizontally disposed rails or guides 18. Slidably mounted on these rails or guides for horizontal movement is a lens panel 19. The longitudinal dimension of the lens panel is less than the distance between the insides of the uprights of the main frame, and, for convenience, by the dimensional value $x$. The lens panel is slidable horizontally over a range equal to the distance between the insides of the uprights of the main frame; and, as the lens panel is shown in Fig. 4 to be in a median position, two additional dimensions $$\frac{x}{2}$$

appear in the figure.

Secured to panel 12 above the upper rail or guide 18 is a bracket 20. Mounted on bracket 20 is another Selsyn repeater B, on the shaft of which is a bevel gear 21 in mesh with another bevel gear 22 mounted on the righthand end of a lead screw 23 which engages a threaded bracket 24 secured to the upper part of the lens panel 19. The righthand portion of lead screw 23 is not threaded and is journaled in a dependent portion 25 of bracket 20. It will be understood that rotation of the lead screw 23 operates to move the lens panel 19 horizontally from left to right or from right to left depending upon the direction of rotation of the screw controlled by the direction of rotation of the repeater B.

Of course the lens itself is moved at right angles to its focal axis when either panel 12 or the lens panel 19 is moved. In the form of the invention illustrated herein a single Selsyn transmitter is employed, and the switching arrangements to be described subsequently are such that only one repeater may be operated at a time. It is observed that the lens could be made to move diagonally by coupling both repeater A and repeater B to a single transmitter; and that a sort of hunting operation in repositioning the focal axis could be made possible by providing an individual transmitter for each of the repeaters mentioned. However, a substantially similar hunting operation may be had with the preferred structure herein illustrated; and, further, this structure has been found to be least expensive. It is perfectly easy, with the structure shown, and with the use of a ground glass, to predetermine the horizontal and vertical movements required of the focal axis.

While, of course, actual dimensions are immaterial, and the relationship of the horizontal dimension to the vertical dimension is also immaterial, here, for convenience, the horizontal and vertical ranges of travel of the lens are equal to each other, and the area of the photographic plane, at the lens, through any point within which the focal axis may pass, is a square $x$ by $x$. The percentage of the actual dimensions of the copy board represented by $x$, is, of course, a matter of expediency, and may vary considerably in different cameras depending upon the character of the work to be handled.

Fig. 6 is an elevational view, in diagram, of an exemplary copy board structure, presumed to be part of a horizontal type camera, and, therefore, insofar as its main frame 26 is concerned, disposed in a vertical plane. Fig. 7 is a top plan view of the same structure; Fig. 8 is a side elevational view thereof; and both last mentioned figures are also in diagram. The main frame 26 is preferably constructed of material of considerable rigidity, and is of rectangular shape, and is fenestrated at 27, the fenestration also being rectangular and of such magnitude as to leave relatively narrow marginal portions of the main frame. Pivotally mounted within the main frame for rotation on a vertical axis is an auxiliary frame 28, structurally similar to the main frame except that the auxiliary frame is of sufficiently less size to enable it to be mounted within the fenestration of the main frame, as best shown in Fig. 6. The auxiliary frame 28 is provided with two studs, both vertically disposed, and one being in the middle of the top of the auxiliary frame and the other being in the middle of the bottom of the same frame. These studs are journaled in the main frame. The auxiliary frame 28 is rectangularly fenestrated at 29. Pivotally mounted within the auxiliary frame 28 for rotation on a horizontal axis is another auxiliary frame 30, also structurally similar to the main frame except that auxiliary frame 30 is sufficiently small to enable it to be mounted within the fenestration of the auxiliary frame 28 (Fig. 6). Auxiliary frame 30 is provided with two studs, both horizontally disposed, one being in the left side of the auxiliary frame 30 and the other being in the middle of the right side of the same frame. These last named studs are journaled in auxiliary frame 28. The auxiliary frame 30 is rectangularly fenestrated at 31. The vertical studs of auxiliary frame 28 are designated 32 (top) and 33 (bottom); the horizontal studs of auxiliary frame 30 are designated 34 (left) and 35 (right). From the foregoing it will be understood that the swinging auxiliary frame is 28, and that the tilting auxiliary frame is 30.

Mounted on the top of the main frame 26 is a Selsyn repeater C, carrying on its shaft a bevel gear 36 meshing with another bevel gear 37 carried on the upper end of stud 32. Thus rotation of the shaft of Selsyn repeater C operates to swing or rotate auxiliary frame 28 on a vertical axis, and, incidentally, to swing all parts dependent upon auxiliary frame 28 for support.

Mounted on a bracket 38 extending horizontally from auxiliary frame 28 (see Figs. 7 and 8) is another Selsyn repeater D, carrying on its shaft a spur gear 39 meshing with an arcuate rack 40 extending from auxiliary frame 30 (best illustrated in Fig. 8). Thus rotation of the shaft of Selsyn repeater D operates to tilt or rotate auxiliary frame 30 on a horizontal axis, and, incidentally, all parts dependent upon auxiliary frame 30 for support.

At the four corners of auxiliary frame 30 are four L-shaped shims, of considerable thickness, all shims being designated 41. Mounted on each shim 41 is a plate member 42, which is roughly triangular in shape except that the hypotenuse is arcuate and concave, the center of the radius of curvature being the center c of the copy board structure. As best shown in Fig. 6 the four members 42 provide an interrupted circular track. A radial cross-section of a member 42 would show that the arcuate edge is beveled from both sides, and actually constitutes a blade rapidly thickening as distance from the edge increases. The cross-section, with respect to the edge and its butt, is in the form of a V.

The copy board proper is a rectangular sheet of suitable material, and is designated 43. Near its four corners are rotatably mounted four wheels 44 each having a V-shaped peripheral groove adapted to engage and roll on or against the arcuate edges of the members 42, as best shown in Fig. 6, wherein the copy board 43 is shown to have been oscillated slightly out of normal position. In solid lines a subject—say, a rectangular picture—is shown mounted on the copy board, and is disposed so that its edges are horizontal and vertical. The subject is designated 45. In dotted lines the subject is shown somewhat askew. It may be assumed that originally the copy board 43 was in normal position, and that it was rotated within its own plane in order to right the subject. The wheels 44 are mounted on that side of the copy board 43 which faces away from the lens board.

A horizontal bar 46 is secured to auxiliary frame 30 and spans the fenestration thereof, as shown best in Fig. 6 (mostly in dotted lines). A bracket 47 is secured to the midportion of bar 46; and another Selsyn repeater E is secured to the underside of this bracket. See Figs. 6, 7, and 8. A spur gear 48 carried on the shaft of Selsyn repeater E meshes with another spur gear rigidly mounted on a stud 49 extending from the center of the copy board. Thus rotation of the shaft of Selsyn repeater E operates to oscillate or rotate the copy board within its own plane.

Fig. 9 is a self-explanatory diagram illustrating an arrangement comprising a single Selsyn transmitter, five Selsyn repeaters, A, B, C, D, and E, a switch for selectively coupling any repeater with the transmitter, and suitable wiring connections.

Fig. 10 is a diagram, in two parts (bracketed), showing an arrangement whereby transmission may be had between spur gears without backlash. In the figure the lefthand element thereof is a view looking at the flat of three gears; the righthand element of the figure is directed at the teeth of two of the gears. Mounted on a shaft 50 are two like spur gears 51 and 52. Gear 51 is keyed to the shaft; gear 52 is free, but in any suitable manner is secured against axial movement along the shaft. A spring wire 53, having one end secured in gear 51 at 54 and its other end secured in gear 52 at 55, is wound under tension around the shaft. Plainly the spring wire tends to straighten out, and consequently tends to rotate the two gears in opposite directions. If the two gears 51 and 52, with the spring wire under tension, are meshed with a third gear 56, it is obvious that gear 51 will tend to drive gear 56 in one direction and gear 52 will tend to drive gear 56 in an opposite direction. The result is that, as shaft 50 is rotated, gear 56 is driven by gear 51, but cannot backlash on account of gear 52. The spur gear transmission shown with relationship to Selsyn repeater D and that shown with relationship to Selsyn repeater E may both employ this arrangement to prevent backlash. If, between Selsyn repeater C and its bevel gear 36, a spur transmission train embodying the above-described arrangement is provided, bevel gear 36 cannot backlash. It will be plain that any of a variety of antibacklash means may be provided; the important point is that the parts moved by the Selsyn repeaters do not backlash on their own repeaters.

I claim:

1. In a camera, a lens panel, a holder for sensitized material, and a copy board, with said panel interposed between said holder and said board; a first main frame, a first auxiliary frame mounted thereon for reciprocation along a straight path, with said panel mounted on said first auxiliary frame for reciprocation along another straight path at right angles to said first-named path, a first Selsyn repeater mounted on said first main frame for effecting reciprocation of said first auxiliary frame, and a second Selsyn repeater mounted on said first auxiliary frame for effecting reciprocation of said panel; a second main frame, a second auxiliary frame mounted thereon for rotation on a first axis, a third auxiliary frame mounted on said second auxiliary frame for rotation on a second axis at right angles to said first axis, with said board mounted on said third auxiliary frame for rotation within its own plane, a third Selsyn repeater mounted on said second main frame for effecting rotation of said second auxiliary frame on said first axis, a fourth Selsyn repeater mounted on said second auxiliary frame for effecting rotation of said third auxiliary frame on said second axis, and a fifth Selsyn repeater mounted on said third auxiliary frame for effecting rotation of said board within its own plane; a Selsyn transmitter; a switch for selectively coupling any one repeater with said transmitter; and means for driving said transmitter.

2. The combination of claim 1, including means for moving said panel toward and away from said holder and said board, and other means for moving said board toward and away from said holder and said panel.

3. The combination of claim 1, including a first lead screw threaded through said first main frame for moving said panel toward and away from said holder and said board, and a second lead screw threaded through said second main frame for moving said board toward and away from said holder and said panel.

4. The combination of claim 1, including means for preventing play between said first, second, third, fourth, and fifth Selsyn repeaters and said first auxiliary frame, said panel, said second auxiliary frame, said third auxiliary frame, and said board, respectively.

References Cited in the file of this patent

UNITED STATES PATENTS

| | | |
|---|---|---|
| 403,476 | Kuhn | May 14, 1889 |
| 600,688 | Goodwin | Mar. 15, 1898 |
| 1,535,225 | Hays | Apr. 28, 1925 |
| 1,597,598 | Jones | Aug. 24, 1926 |
| 1,847,010 | Koppe | Feb. 23, 1932 |
| 1,892,683 | Robertson | Jan. 3, 1933 |
| 2,147,434 | Gallaher | Feb. 14, 1939 |
| 2,406,550 | Long | Aug. 27, 1946 |